United States Patent [19]
Fletcher et al.

[11] 3,820,388
[45] June 28, 1974

[54] DEVICE FOR MEASURING TENSILE FORCES

[76] Inventors: James C. Fletcher, Administrator of the National Aeronautics and Space Administration with respect to an invention of; Walter T. Appleberry, 3440 Val Verde Ave., Long Beach, Calif. 90808

[22] Filed: May 21, 1973

[21] Appl. No.: 361,907

[52] U.S. Cl. ............................................... 73/141 A
[51] Int. Cl. ................................................ G01l 1/04
[58] Field of Search ..... 33/164 R, 164 B; 73/141 R, 73/141 A

[56] References Cited
UNITED STATES PATENTS
1,650,789   11/1927   Doolittle ........................... 73/141 A

*Primary Examiner*—Jerry W. Myracle
*Attorney, Agent, or Firm*—W. H. Riggins; L. D. Wofford, Jr.; J. R. Manning

[57] ABSTRACT

A device for measuring tensile forces, characterized by an elongated body having predetermined elastic properties, whereby applied tensile force of any magnitude, within a given range, imparts to the body an elongation of a predetermined length, a sleeve mounted on the body in threaded relation therewith and an internally threaded, axially displaceable nut pinned to the sleeve, the threads of said nut being finer than the threads of said sleeve, whereby the sleeve is caused to advance axially relative to the nut as torque-induced angular motion is imparted to the sleeve and nut at a common rate. The magnitude of applied tensile force is indicated as a function of the angular motion afforded the sleeve.

5 Claims, 5 Drawing Figures

X MOTION DUE TO BODY ELONGATION
+ Y MOTION DUE TO THREAD DIFFERENTIAL
Z TOTAL MOTION

DEVICE FOR MEASURING TENSILE FORCES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2,457).

BACKGROUND OF THE INVENTION

The invention relates to devices for measuring tensile stress and more specifically to a compact simple and economic device which can readily be employed in measuring tensile force applied to a given body.

The prior art, of course, is replete with devices intended for use in determining the magnitudes of tensile forces applied to given bodies. Such devices are exemplified by strain gages, tensiometers and similar mechanisms particularly suited for use in measuring strain resulting from stress as tensile forces are applied to tension members such as straps, cables, tie-rods, beams, and the like. It is, however, appreciated by those familiar with such mechanisms that their use is time-consuming and often impractical, moreover, frequently prove to be inaccurate. In attempting to overcome these inadequacies, various complex mechanisms have been proposed. However, their use is restricted because of the resulting costs.

Therefore, the general purpose of the instant invention is to provide a practical, economic and simple device which can readily be employed in measuring stress resulting from tensile forces applied to structural members of a variety of types.

OBJECTS AND SUMMARY OF THE INVENTION

It is therefore an object of the instant invention to provide a practical device for measuring tensile force which overcomes the aforementioned difficulties.

It is another object to provide a practical, simple, and economic device which can readily be employed in accurately determining the magnitude of applied tensile force with minimum ease.

It is another object to provide an improved device which can be employed in a manner consistent with that of a common turnbuckle for measuring strain resulting from applied tensile force.

These and other objects and advantages are achieved through the use of a device including a substantially elongated body having predetermined elastic properties, whereby tensile forces acting on the body induce therewithin stress of proportional magnitudes resulting in elongations of lengths proportional to the induced stress, and having a first threaded portion for joining the body at a first end thereof to an adjacent end of a tension member and a second threaded portion for joining the second end of the body to a second tension member, and a third threaded portion having fewer threads per inch than the second threaded portion, an internally threaded sleeve, bearing a vernier scale, mated with the third threaded portion, and an internally threaded nut coaxially related with the sleeve and mated with the second threaded portion supported for axial displacement relative to the adjacent end of the sleeve. Connecting pins are provided for coupling the nut with the sleeve in a manner such that the nut is restrained by the sleeve against relative annular displacement while relative axial displacement between the sleeve and the nut is accommodated. Thus, the sleeve is afforded axial motion, relative to the nut, as a consequence of both a tensile force applied to the body and the differential threading of the nut and sleeve, whereby amplified rotation of the sleeve is accommodated for indicating the magnitude of the applied force, as will hereinafter become more readily apparent by reference to the following description and claims in light of the accompanying drawings.

DESCRIPTION OF THE PREFERRED EMBODIMENT

Figure 1:
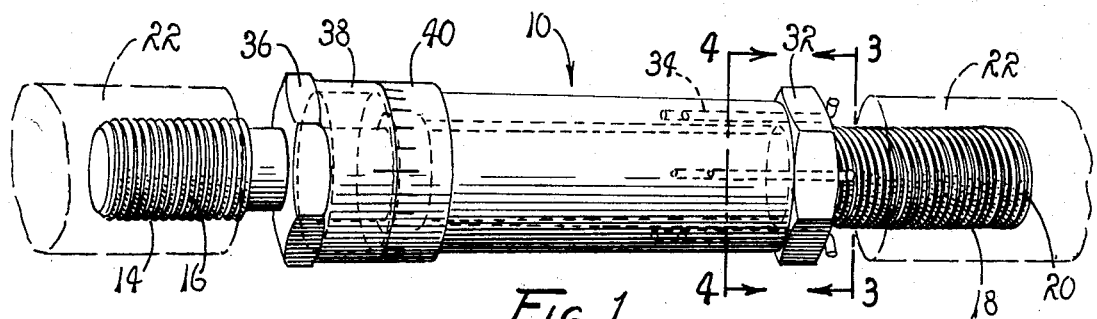
FIG. 1 is a perspective view of a device which embodies the principles of the instant invention.

Referring now to the drawings wherein like reference characters designate like or corresponding parts throughout the several views, there is shown in FIG. 1 a perspective view of a device 10 which embodies the principles of the instant invention.

Figure 2:
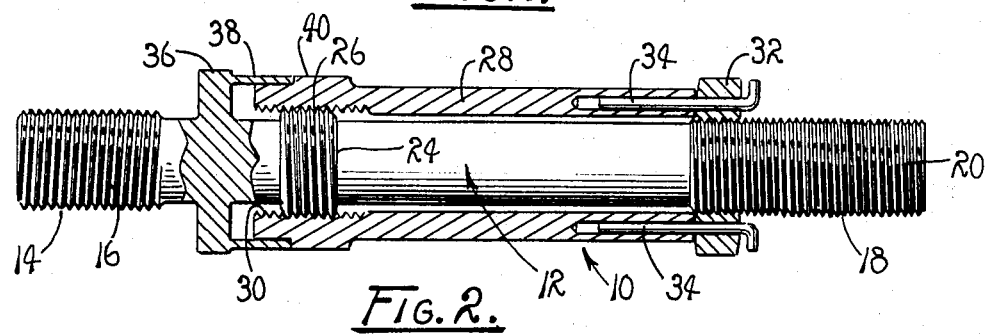
FIG. 2 is a cross-sectional view of the device shown in FIG. 1.
Figure 3:
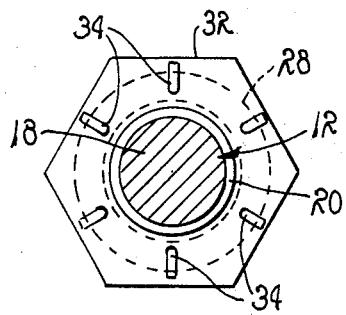
FIG. 3 is a cross-sectional view taken generally along line 3—3 of FIG. 1.
Figure 4:
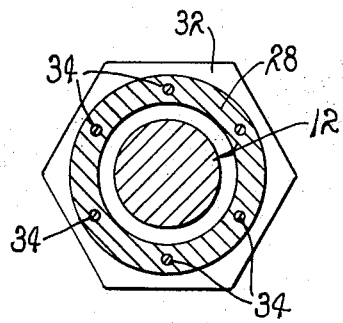
FIG. 4 is a cross-sectional view, taken generally along line 4—4 of FIG. 1.

As best shown in FIG. 2 the device 10 includes an elongated body 12. This body is formed of any suitable material, including steel and the like, which has a propensity to elongate when subjected to tensile force of substantial magnitudes. In practice, the device 10 is employed in coupling tension members in a manner quite similar to that of an ordinary turnbuckle. Accordingly, it is preferred that the device include a first threaded terminal segment 14, preferably having a left-hand thread 16, and a second threaded terminal segment 18, preferably having a right-hand thread 20 so that the device can be inserted into a pair of suitable, coaxially aligned, barrels 22, as illustrated in FIG. 1. Hence, tensile stress is induced within the body 12 in a manner quite similar to that in which tensile stress is induced in an ordinary turnbuckle. Since turnbuckles are well known, a detailed discussion thereof is omitted in the interest of brevity.

The device 10 further includes an intermediate threaded segment 24, adjacent the first terminal segment 14, bearing a right-hand thread 26 of a pitch defined by fewer threads per inch than that of the thread 20. Thus the body 12 is characterized by a pair of differentially threaded, coaxially related segments.

Received in telescopic fashion about the body 12, there is a sleeve 28 having an internal diameter slightly greater than the outside diameter of the body. The sleeve 28, adjacent one end thereof includes an internally threaded segment 30 which mates with the threaded segment 24 of the body. Consequently, it is to be understood that as a rotating force is applied to the sleeve 28 it simultaneously is advanced in both axial and angular directions relative to the surface of the body 12. However, in order to limit an advance thus imparted to the sleeve there is provided an internally threaded nut 32 which functions as a so-called jam nut.

This nut is supported by the threaded segment 18 of the body 12 so that motion imparted thereto in a selected axial direction serves to move the nut into an abutting engagement with the adjacent end of the sleeve 28.

It is to be understood that due to the thread differential of the segments 18 and 24, the sleeve 28 and nut 32 are displaced at different rates, in axial directions, as angular displacement of a common rate is imparted thereto. In order to assure that a common rate of angular displacement is imparted to the sleeve and the nut, a plurality of pins 34 is extended through suitably formed openings provided in the nut 32 and received in suitable openings provided in the adjacent end face of the sleeve 28. As a practical matter, it is intended that the pins 34 accommodate relative motion of the sleeve 28 and the nut 32. Accordingly, the pins preferably are fixed within the openings provided in the nut 32, while axial displacement of the pins within suitably formed openings provided within the face of the sleeve is accommodated. Of course, where desired, a reversed relationship can be employed. Similarly, where so desired, the sleeve 28 is suitably configured for receiving therein splined portions of the nut 32, not shown. Therefore, it is to be clearly understood that the particular manner in which the sleeve 28 and the nut 32 are united for accommodating relative motion in axial directions, while any substantial, relative angular displacement thereof is avoided, is a matter of convenience.

As illustrated in FIG. 1, the body 12 is provided with a hex head 36 having a symmetrically related plurality of flats for receiving a wrench applied thereto. Thus an application of torque is accommodated for advancing the threaded terminal segments 14 and 18 into adjacent barrels 22 in a manner consistent with that of an ordinary turnbuckle.

Importantly, it is to be understood that the hex head 36 is provided with a suitable skirt 38 of a cylindrical configuration. The skirt is integrally related with the nut and is extended into juxtaposition with a similar surface 40 provided about the adjacent end of the sleeve 28. The skirt 38 and surface 40 are supplied with suitable indicia forming a vernier scale, not designated, so that relative motion therebetween can readily be observed. Accordingly, it can be appreciated that angular displacement of the sleeve 28 relative to the body 12 is indicated by the indicia of the vernier scale. Moreover, the angular distance through which the sleeve is displaced is indicative of the magnitude of an elongation of the body 12 resulting from tensile forces applied thereto.

In assembling the device 10, the sleeve 28 preferably is threaded onto the threaded segment 24 of the body sufficiently for seating the skirt 38 adjacent the surface 40, preferably in juxtaposed relation. Thereafter, the nut 32 is advanced along the thread 20 into an abutted relationship with the adjacent end of the sleeve 28. Thereafter, the plurality of pins 34 is inserted into coaxially aligned openings provided in the nut and sleeve. Thereafter, pins are secured in place relative to the nut employing any suitable technique such as braising and the like.

Since the body 12 is formed of a material having known elastic properties, the propensity of the body to elongate under selected tensile stress is a known factor. Consequently, the distance through which the body 12 is caused to elongate, when subjected to a tensile force of an unknown magnitude, serves to indicate the magnitude of the force applied thereto. Therefore, as the body 12 is caused to elongate relative motion of the pins 32 and the sleeve 28 is experienced so that axial motion of the nut 32 is accommodated as the nut is displaced relative to the adjacent end of the sleeve 28.

A simple rotation or angular displacement of the sleeve 28 causes the sleeve to advance along the thread 26 until such time as the sleeve is caused to abut the nut 32. Since the nut 32 and sleeve 28 are pinned together, the nut also is advanced in an axial direction, simultaneously with the sleeve. However, due to the effects of the thread differential, for the segments 18 and 24, the sleeve 28 overtakes and abuts the nut 32, whereupon all motion thereof ceases. The difference in the pitch of the threads 20 and 26 thus, in effect, provides for a magnification of the elongated condition of the body 12, since substantial threaded advancement simultaneously is imparted to the nut as torque is applied to the sleeve.

Through the magnification of the elongation, a measurement of the stress-induced elongation employing the vernier scale provided on the adjacent skirt 38 and surface 40 can be achieved, even when the elastic properties of the body are slight.

OPERATION

It is believed that in view of the foregoing description, the operation of the device will readily be understood and it will be briefly reviewed at this point.

With the device 10 assembled in the manner hereinbefore described, the sleeve 28 is seated in an abutted relationship with the skirt 38 and in threaded relation with the body 12. The nut 32, in turn, is seated in abutted relationship with the adjacent end of the sleeve 28. The device 10 thus is readied to be employed in coupling a pair of tension members terminating in barrels 22, in a manner consistent with that of an ordinary turnbuckle. This is achieved by applying a wrench to the nut 36 for simultaneously advancing the first threaded segment 16 and the second threaded segment 18 of the body into the juxtaposed and coaxially aligned barrels 22.

As sufficient torque is applied to the device 10, at the hex head 36, the body 12 is stressed and subsequently strained or elongated, whereupon the nut 32 is displaced axially relative to the adjacent end of the sleeve 38, as a consequence of the stress induced by the applied tensile forces.

Figure 5:
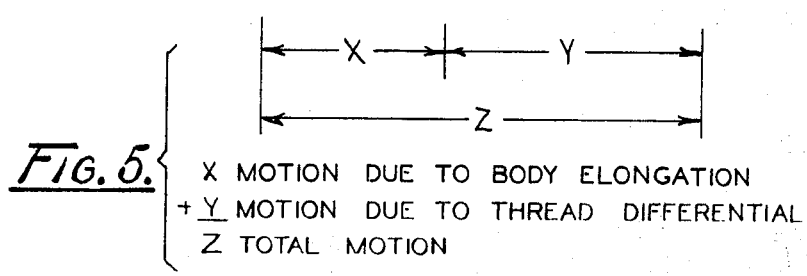
FIG. 5 is a motion diagram illustrating the manner in which total motion is imparted to the sleeve in an axial direction.

In order to determine the instantaneous magnitude of the tensile force thus applied, the sleeve 28 is rotated, through digitation, relative to the body 12 for simultaneously rotating the sleeve 28 and the nut 32. Rotation of the sleeve and nut permits the sleeve to be advanced in an axial direction through total motion Z, relative to the body 12. As illustrated in FIG. 5 of the drawing, the motion Z is the sum of the motion afforded the sleeve due to the elongation or strain of the body and the motion afforded due to thread differential of the segments 18 and 24. The angular motion of the sleeve 28 relative to the body is indicated by the vernier scale provided for the adjacent skirt 38 and surface 40. Due to the fact that the nut 32 is angularly displaced relative to the body 12 at a rate substantially the same as that of the sleeve 28, but is axially directed at a somewhat slower rate, the sleeve 28 is permitted to "catch up" with the nut so that the nut is caused to function as a jam-nut for terminating all relative motion between the sleeve and the nut. This additional motion afforded the sleeve by the nut 32, in effect, magnifies the elongations so that the elongation can be detected employing the aforementioned vernier scale, even when the body 12 is fabricated from materials having only slight elastic characteristics.

Of course, in order to achieve the precise tensioning of the members to which the device 10 is coupled, multiple readings are readily accommodated due to the fact that reversed motion can be imparted to the sleeve 28 and the nut 32 for repositioning the sleeve and nut to their initial positions.

For reasons which should readily be apparent, calibration of the device can be calculated and/or empirically established.

In view of the foregoing, it is to be understood that the device 10 of the instant invention provides a practical solution to the perplexing problem of providing a practical, accurate and economic device for use in loading tension members with precisely measured stress.

Although the invention has been herein shown and described in what is conceived to be the most practical and preferred embodiment, it is recognized that departures may be made therefrom within the scope of the invention, which is not to be limited to the illustrative details disclosed.

I claim:

1. A device for measuring tensile force comprising:

A. a substantially elongated body having predetermined elastic properties, whereby an applied tensile force of a given magnitude imparts to the body an elongation of a length proportional to the magnitude of the force;
   B. means for measuring the length of the elongation imparted to the body for thereby determining the magnitude of the applied force;
   C. said means for measuring the length of said elongation including a sleeve telescopically related to said body;
   D. support means for supporting said sleeve for rotation relative to said body through an angle having a magnitude proportional to the length of said elongation;
   E. said support means also supporting said sleeve for motion in axial directions, relative to said body, through a distance greater than the length of said elongation.

2. The device of claim 1 wherein said support means comprises a first pair of axially spaced screw-threads having mutually differing pitches formed about said body; and said means for measuring the length of the elongation imparted to said body includes a screw-thread provided internally of said sleeve and mated with one screw-thread of said pair, a threaded nut received by the other screw-thread of said pair, and coupling means for coupling said nut with said sleeve in a manner such that motion of the nut in axial directions relative to said sleeve is accommodated while the nut simultaneously is restrained against angular motion relative to the sleeve.

3. The device of claim 2 wherein said coupling means includes a pin extended through an opening formed in the nut and received in an opening formed in said sleeve.

4. A device for measuring tensile stress comprising:

A. a substantially elongated body having predetermined elastic properties, whereby applied tensile stress of given magnitudes imparts to the body elongations of predetermined lengths, including means for joining said body at its first and second ends to adjacent ends of a pair of tension members comprising a first set of threads provided near the first end thereof, and a second set of threads provided near the second end thereof; and
   B. means for measuring the magnitude of elongations imparted to said body including,
      i. a third set of screw-threads formed about said body, adjacent to said first set of threads, having fewer threads per inch than said second set of threads,
      ii. an internally threaded sleeve mated with said third set of threads supporting said sleeve for threaded advancement relative to said body, whereby the sleeve is supported for simultaneous motion in angular and axial directions relative to said body,
      iii. an internally threaded nut mated with said second set of screw-threads supported for simultaneous angular and axial motion relative to said body and for axial displacement relative to said sleeve, and
      iv. means for coupling the nut to the sleeve in a manner such that the nut is restrained by the sleeve against angular displacement relative thereto.

5. The device of claim 4 wherein said means for coupling the nut to the sleeve includes a pin extended therebetween.

* * * * *